(12) United States Patent
Bushong, Jr.

(10) Patent No.: US 9,318,996 B2
(45) Date of Patent: Apr. 19, 2016

(54) SOLAR ENERGY APPARATUS AND METHODS

(71) Applicant: James H. Bushong, Jr., Collegeville, PA (US)

(72) Inventor: James H. Bushong, Jr., Collegeville, PA (US)

(*) Notice: Subject to any disclaimer, the term of this patent is extended or adjusted under 35 U.S.C. 154(b) by 0 days.

(21) Appl. No.: 14/597,463

(22) Filed: Jan. 15, 2015

(65) Prior Publication Data

US 2015/0194926 A1    Jul. 9, 2015

Related U.S. Application Data

(63) Continuation-in-part of application No. 13/792,210, filed on Mar. 11, 2013, now abandoned.

(60) Provisional application No. 61/961,463, filed on Oct. 15, 2013, provisional application No. 61/996,792, filed on May 15, 2014.

(51) Int. Cl.
*H02S 40/44* (2014.01)
*F24J 2/28* (2006.01)
*B62M 3/08* (2006.01)

(52) U.S. Cl.
CPC ............ *H02S 40/44* (2014.12); *B62M 3/08* (2013.01); *F24J 2/28* (2013.01); *Y02B 10/20* (2013.01); *Y02B 10/70* (2013.01); *Y10T 74/2168* (2015.01)

(58) Field of Classification Search
CPC ............ H02S 40/44; F24J 2/28; F24J 2/487; F24J 2/48; F24J 2/4652; F24J 2002/4689; B62M 3/08; Y10T 74/2168; Y02B 10/70; Y02B 10/20
See application file for complete search history.

(56) References Cited

U.S. PATENT DOCUMENTS 4,262,657 A * 4/1981 McCullough ......... F24D 11/007
                                                         126/617

* cited by examiner

*Primary Examiner* — Alfred Basichas
(74) *Attorney, Agent, or Firm* — James M. Smedley LLC; James Michael Smedley, Esq.

(57) ABSTRACT

The invention is for improved solar energy collection apparatus that utilize one or more 3-dimensional porous metal absorber plates that contain one or more materials that can harness either or both solar thermal and solar electric energy. Working fluid can traverse throughout the depth, width, and length of the 3-dimensional porous metal absorber plate in order to extract solar thermal energy absorbed therein. Working fluid can be guided throughout the porous metal absorber plate in an alternating flow pattern with contoured cover glazing, to extract solar energy at high efficiency while reducing flow resistance. Working fluid that contains materials that exhibit the photovoltaic effect can traverse within the solar energy collection apparatus. The utility includes a wide variety of practical uses such as energy for hot water heating, space heating, aquaculture, industrial production processes, and other thermal or electric energy applications. The invention can also be utilized for other multi-functionality purposes such as combined effects of air pollution reduction and solar energy harvest inside the improved solar energy collectors.

18 Claims, 6 Drawing Sheets

SOLAR ENERGY APPARATUS AND METHODS

CROSS REFERENCE TO RELATED APPLICATIONS

This application is a continuation in-part of: (i) U.S. non-provisional application Ser. No. 13/790,210 filed on Mar. 8, 2013 and entitled Improved Solar Energy Collectors and Methods for Solar Energy Systems which claims the benefit of U.S. provisional application Ser. No. 61/961,463 filed Oct. 15, 2013, entitled Solar Energy Apparatus and Methods, (ii) U.S. provisional application Ser. No. 61/996,792 filed May 15, 2014 entitled Solar Energy Collectors and Systems, and (iii) international application serial no. PCT/US2014/060564 filed on Oct. 15, 2014, each of which is herein incorporated by reference in its entirety.

FIELD OF THE INVENTION

The present invention relates generally to apparatus and methods of improving solar energy collection and utilization. The utility of the present invention includes a wide variety of practical uses such as energy for hot water heating, space heating, aquaculture, industrial production processes, and other thermal or electric energy applications. The present invention can also be utilized for multi-functionality such as combined solar electric and thermal energy harvest inside the improved solar energy collectors of the present invention, and for example combined effects of air pollution reduction and thermal energy harvest inside the improved solar energy collectors of the present invention, and various combinations thereof.

BACKGROUND ART

Solar thermal energy collection is used commercially for hot water heating and space heating. Typically a flat plate solar collector is utilized to absorb the solar energy onto a highly conductive flat sheet-metal plate, and the solar energy is transferred from the flat plate to tubes (typically copper) containing water or other heat transfer fluid circulating through the tubes, and the heat is exchanged for heating water. Other type of solar collectors for thermal energy systems include evacuated glass tubes, wherein the heat transfer fluid-containing tubes are integrated into the evacuated glass tubes to improve radiant heat absorption efficiency by reducing convective heat losses within the evacuated glass tubes. Evacuated tube collectors enable a higher temperature to be achieved compared to conventional flat plate collectors, but at some loss in heat transfer area relative to a flat plate collector of the same overall system physical dimensions. Solar electric photovoltaic cells are used commercially to provide electricity. A wide variety of materials that exhibit the photovoltaic electric effect are utilized in providing solar electric energy from solar electric photovoltaic cells.

SUMMARY OF INVENTION

The present invention relates generally to apparatus for harnessing either or both solar electrical energy and solar thermal energy, methods for transferring the solar energy out of the apparatus, and various multi-functional effects such as reducing air pollution while at the same time generating solar energy in the apparatus and methods of the present invention. The invention claims the benefit of U.S. provisional application Ser. Nos. 61/961,463 and 61/996,792, and is a continuation in-part of U.S. non-provisional application Ser. No. 13/792,210.

The solar energy collection apparatus of the present invention utilizes the porous metal solar energy absorber plates that were claimed previously in U.S. non-provisional application Ser. No. 13/790,210. These porous metal solar energy absorber plates are characterized by utilizing a 3-dimensional porous metal absorber plate that has an open lattice-work of air pores and channels within inter-connected strands of metal, and maintains sufficient inter-connectivity of metal strands to remain a singular object. Because the porous metal plates of the present invention comprise of substantially inter-connected strands of metal, the porosity of the porous metal plates of the present invention can be higher while still retaining strength to be a singular object compared to individual strands of materials that are woven or pressed together. The porosity of the porous metal absorber plate can range from approximately 85% to 98%, or from approximately 90% to about 98%. The porosity of the metal absorber plate for the present invention can be selected such that working fluid can be passed directly throughout any of the length, depth, and width axis of the absorber plate. The air pores located in-between the substantially inter-connected strands of metal form air channels that are substantially inter-connected throughout the length, width, and depth axis of the porous metal absorber plate of the present invention so that working fluid can traverse throughout any of the length, width and depth axis of the porous metal absorber plate. The porosity of the metal absorber plate of the present invention can be selected such that working fluid can pass directly through long path lengths of the porous 3-dimensional absorber plate, such as 100 millimeter (mm) path lengths or more, or even 200 mm path lengths or more, or even 500 mm path lengths or more, or even 900 mm path lengths or more. The long path length for working fluid to traverse while contacting the inter-connected strands of metal in the porous 3-dimensional absorber plate enables excellent transfer of solar energy absorbed onto the metal strands to the working fluid. As used herein, the term "working fluid" refers to any liquid, gas, or solid that solar energy can beneficially be imparted to for any purpose. The pore size of the porous metal absorber plate can range from about 0.1 mm to about 10 mm, or from about 0.1 to about 5 mm, or from about 0.1 to about 3 mm. The volume density of the porous metal absorber plate of the present invention can be from approximately 0.1 to about 3 grams per cubic centimeter (cc), or from about 0.1 to about 2 grams/cc, or from about 0.1 to about 1 grams/cc. The porous metal absorber plate of the present invention is a 3-dimensional structure, with a depth of the porous metal absorber plate that can range from about 1 mm to about 100 mm, or from about 1 mm to about 50 mm, or from about 1 mm to about 25 mm, or from about 1 to about 10 mm, or from about 2 to about 10 mm, or from about 3 to about 6 mm. The pore structure is irregular geometry so that the path through the porous metal absorber plate is tortuous; this is in contrast to other types of porous structures that have a regular geometry such as a honeycomb structure. As used herein, the term "irregular geometry pore structure" refers to any non-symmetrical pore structure; an example of a "regular geometry pore structure" would be a honeycomb structure that has well-defined geometric channels of air. The irregular geometry pore structure of the present invention can consist of rounded or other shaped pores that are inter-connected at various depths along the depth axis of the porous metal absorber plate such that the pore structure along the depth, width, and length access is irregular, creating a tortuous path throughout the depth, width, and length of the porous metal absorber plate. The tortuous path through the porous metal absorber plate enables improved heat transfer from the solar energy absorbed on the metal strands of the porous metal absorber plate to the working fluid, and can enable improved capture of the sun light by trapping the sun light in a structure with chaotic reflections, absorption, and transmission of sun light due to the irregular pore structure, compared to regular geometry pore structures. The metal of the porous metal absorber can be one or more metals or metal compounds selected from the group consisting of copper, aluminum, silicon, silicon dioxide, manganese dioxide, titanium dioxide, cadmium telluride, copper indium selenide/sulfide, metals of the periodic table of elements, metal oxides, metalloids of the periodic table of elements, organometallic compounds that exhibit the photovoltaic electric effect, dye sensitized solar cell photovoltaic materials, and any other material that exhibits the photovoltaic electric effect. Open-celled foamed metal structures are preferred for the present invention, wherein open-cell foamed metal structures comprise of air pores that form air channels that are substantially inter-connected throughout the length, width, and depth axis of the porous metal absorber plate of the present invention, and the exceptionally high porosity of these foamed metal structures while possessing sufficient inter-connected strands of metal to remain sufficiently strong as a singular object. Foamed copper and foamed aluminum are particularly preferred for their exceptional thermal and electrical properties such as thermal and electrical conductivity. The porous metal absorber plates of the present invention can also serve as a substrate. Foamed metals, and particularly foamed copper and foamed aluminum are particularly preferred for use as a substrate that incorporates one or more other metals, metal compounds, and/or organic compounds or organometallic compounds that exhibit the photovoltaic electric effect, wherein the other metals, metal compounds, and/or organic compounds or organometallic compounds that exhibit the photovoltaic electric effect are either incorporated within the foamed copper or foamed aluminum 3-dimensional porous absorber plates matrix of metal strands and/or coated onto the 3-dimensional foamed copper or foamed aluminum porous absorber plates. A multi-junction thin film solar photovoltaic combination, such as gallium arsenide, germanium, and gallium indium phosphide, can be incorporated into, and/or coated onto, the 3-dimensional porous metal absorber plates of the present invention. For example, more solar photovoltaic production per unit front absorber plate area can be gained by using more depth of the porous metal absorber plate and any material exhibiting the solar photovoltaic effect incorporated into or coated onto the 3-dimensional porous metal absorber plate, instead of the typical thin surface of 2-dimensional absorbing panels in photovoltaic applications. The increased photovoltaic production per unit front absorber area can substantially reduce the space requirements of a solar photovoltaic system. The entire porous metal absorber plate can be comprised of solar photovoltaic generating materials, or a combination of solar photovoltaic generating materials and other metals that offer either or both high thermal and electrical conductivity. In other applications, a working fluid that contains one or more materials that exhibit the photovoltaic effect can be passed through or contained within the 3-dimensional porous metal absorber plate, and the electrical energy generated from the photovoltaic effect can conduct throughout the 3-dimensional porous metal network. The electrical energy conducted throughout the porous metal network can flow into wire or a metal plate or a metal grid where it can be utilized to achieve useful electrical energy work.

The porous metal solar energy collectors of the present invention can utilize at least a front side glazing that is made of a transparent or semi-transparent material. As used herein, the term "front side" refers to the glazing that is closest to the sun, and the term "back side" refers to the glazing that is slightly further away from the sun by approximately the depth of the porous metal absorber plate. The porous metal solar energy collectors of the present invention can also utilize a back cover glazing that can be transparent or semi-transparent or opaque. Utilizing a transparent back cover glazing can enable additional transparent area for solar energy to be reflected onto and harvested by the porous metal absorber plate and any working fluid traversing therein. Alternatively, a solar light reflective coating or solar light reflecting film can be placed on the back cover glazing, to enable sun light that transmits through the porous metal absorber plate to be reflected back into the porous metal absorber plate. Double-walled glazing can be used for either or both of the front and back side glazing, and the space in-between the double-walls can be air, or filled with an inert gas, or evacuated, to improve the insulating abilities of the glazing. Sidewalls that join the front and back cover glazings together, to form a complete seal around the porous metal absorber plate, can be utilized. One or more entry ports and one or more exit ports can be incorporated into any sidewall or glazing face in order to enable working fluid to enter and exit the solar energy collection apparatus of the present invention.

The present invention can also feature cover glazings in contoured shapes that guide a working fluid through the porous metal plates in a specific manner, such that the working fluid can efficiently extract the thermal energy while maintaining less flow resistance. The specific manner in which the contoured-shaped cover glazings guide the working fluid is such that the working fluid is guided along the top, through the depth, and along the bottom of the porous metal plate at alternating intervals along at least the length axis of the porous metal absorber plate. As used herein, the term "alternating intervals" means that the working fluid flow switches from being substantially on the top and through the depth of the porous metal absorber plate along some distance of the length axis, to being substantially on the bottom and through the depth of the porous metal absorber plate along some distance of the length axis of the porous metal absorber plate. As used herein, the term "top" of the porous metal absorber plate refers to the face of the absorber plate that is closest to the sun, and the term "bottom" of the porous metal absorber plate refers to the face of the absorber plate that is slightly further away from the sun by the depth of the porous metal absorber plate. As used herein, the length axis is referred to as the "Y axis" of the porous metal absorber plate, and represents the axis corresponding to the net direction of working fluid flow into and out of the solar energy collection apparatus of the present invention. The working fluid is guided through the depth axis by having the contour of the cover glazing guide the fluid flow through the depth axis of the porous metal absorber plate. As used herein, the depth axis of the porous metal absorber plate is referred to as the "Z axis." This method of alternating interval, contoured flow enables less flow resistance as the working fluid on top of and below the porous metal encounters very little flow resistance, and the fluid traversing through the depth of the porous metal absorber plate encounters the resistance of the porous metal mostly only through the short depth of the porous metal plate that is typically only 2 to 10 mm thick. Forcing the working fluid flow direction using the contoured-cover glazing design enables high-efficiency sweeping action of the working fluid to extract the solar thermal energy absorbed in the porous metal absorber plate from the top, the depth, and bottom faces of the porous metal absorber plate while maintaining a lower total resistance to flow compared to forcing the flow through the entire length axis of the porous metal absorber plate. The length axis of the porous metal absorber plate of the solar energy collectors of the present invention is typically 100 mm or more. A lower total resistance to flow enables lower power requirements of the pump, blower, or compressor to move the working fluid. The contours of the cover glazings can be the same shape across any certain location along the width axis of the porous metal absorber plate. The contours of the cover glazings can also exhibit alternating patterns across any certain location of the width axis, in order to induce an alternating "top and bottom" sweeping action of the working fluid across the width axis of the porous metal absorber plate in addition to the length axis of the porous metal absorber plate. As used herein, the width axis of the porous metal absorber plate is defined as the "X axis."

Working fluid can enter into the solar energy collector apparatus of the present invention, either by means of forced convection by pulling vacuum at the outlet of the solar energy collector apparatus with a mechanical device such as an air blower or air compressor or pump, or by forced convection by pressurizing a working fluid with a mechanical device such as an air blower or air compressor or pump at an inlet of the solar energy collector apparatus, or by gravity, or natural convection, or by thermosiphoning, or any other means of fluid motion. Working fluid that traverses throughout the 3-dimensional porous metal absorber plate can efficiently extract solar thermal energy absorbed by the 3-dimensional porous metal absorber plate. The working fluid can then traverse to another location via duct or conduit or other means, wherein the solar thermal energy absorbed in the working fluid can be utilized for useful work. Other appropriate materials selected from the list of metals, metal compounds, metalloids, organic compounds, or organometallic compounds that are incorporated into and/or coated onto the 3-dimensional porous metal absorber plate can provide electricity from the solar photovoltaic effect and/or catalytic destruction of undesirable constituents that may be in the working fluid and/or other useful effects. The electricity provided from the solar photovoltaic effect can conveniently be carried along the metal strands of the porous metal absorber plate acting as electrical wire. Utilizing both solar thermal energy harvest and solar photovoltaic energy harvest in the 3-dimensional porous metal absorber plates is an outstanding way to maximize the solar energy for a wide variety of uses. Additionally, by harvesting the solar thermal energy via a working fluid that traverses directly through the 3-dimensional porous metal absorber plate, the working fluid can keep the solar energy collection apparatus cooler. The photovoltaic electrical energy generation efficiency is well known to be higher at cooler temperatures. Particularly preferred working fluid is gas-phase fluid, and a particularly preferred method is to used forced convection of air through the solar energy collection apparatus of the present invention to transfer the solar thermal energy to the air to achieve useful thermal energy work while cooling the porous metal absorber plate such that solar photovoltaic materials incorporated into or coated onto the porous metal absorber plate can achieve high efficiency solar electricity generation. Alternatively for some applications, only solar thermal energy is utilized from the solar energy collection apparatus of the present invention. In thermal energy applications, examples of working fluid to force through the solar energy collectors of the present invention include gases, ambient air, and air that can be at higher than ambient temperature that is drawn from an area where heat is not desired such as an attic or boiler room, or flue gas exhaust from a gas water heater or boiler. By utilizing higher than ambient air temperature from a location where it is undesirable such as an attic, additional thermal energy can be harvested to improve the energy output and economics of the total system. Wasted heat energy that passes out the exhaust (flue gas) of a gas water heater or boiler can be re-captured when passed through the solar energy collectors of the present invention. For applications where flue gas is used as some or all of the working fluid to the solar energy collectors of the present invention, the porous metal absorber plate can have appropriate materials coated onto or incorporated into the metal strands that can destroy or reduce the concentration of toxins such as nitrogen oxides in the flue gas. Alternatively for other applications, only solar electrical energy is utilized from the solar energy collection apparatus of the present invention.

The solar energy collection apparatus of the present invention can also be utilized as a wall or a roof for a structure; thus in addition to providing solar energy, the solar energy collection apparatus of the present invention provides protection and/or privacy from the outdoors by acting as a wall or a roof for a structure. Part or all of a wall or roof can be the solar energy collection apparatus of the present invention.

One example of a useful application of the present invention is to offer a solar energy apparatus and methods of solar energy utilization wherein both solar thermal energy and solar electrical energy are produced from the solar energy apparatus. In this example, the apparatus can provide both forms of useful energy for any purpose.

Another example of a useful application of the present invention is to offer a solar energy apparatus and methods of solar energy utilization wherein solar electrical energy is produced from the solar energy apparatus. In this example, the solar electrical energy can be used for any purpose.

Another example of a useful application of the present invention is to offer a solar energy apparatus and methods of solar energy utilization wherein solar thermal energy is produced from the solar energy apparatus. In this example, the solar thermal energy can be used for any purpose.

Another example of a useful application of the present invention is to offer a solar energy apparatus and methods of solar energy utilization wherein solar thermal energy is produced from the solar energy apparatus while at the same time destroying or reducing the concentration of undesirable constituents in a working fluid such as pollutants. In this example, the solar thermal energy can be used for any purpose.

In other examples, any combination of solar thermal energy, solar photovoltaic energy, and destruction of undesirable constituents in a working fluid can be achieved in the solar energy apparatus of the present invention.

Further, since the porosity of the porous metal absorber plate of the present invention is as high as 95 to 97% for the solar energy collection apparatus of the present invention, these performance advantages and utility are achieved with very little metal mass. Conserving metal mass while still obtaining outstanding performance advantages is a key breakthrough for growing global populations competing for the earth's limited resources, and to keep the costs of the solar energy collectors of the present invention lower.

BRIEF DESCRIPTION OF DRAWINGS

In FIG. 2, the plane of the paper is identical to the plane of the X and Y axis, with the Z axis going "into" the paper.

Figure 1:
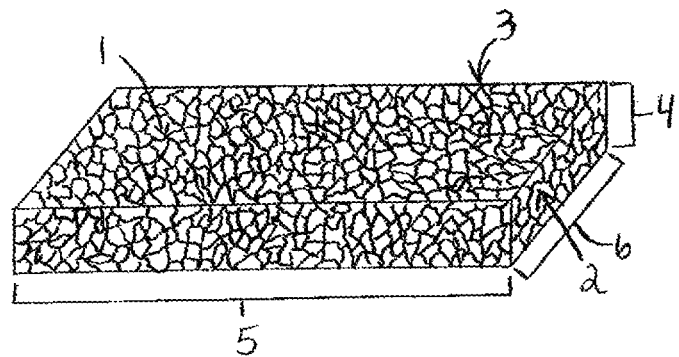
FIG. 1 shows a top and side view of an example of the 3-dimensional porous metal absorber plate of the present invention, with Reference numeral 1 pointing to an example of strand of metal that is substantially inter-connected to other strand of metal such that the inter-connected strands of metal form the singular 3-dimensional object indicated as Reference 3, with an open lattice-work of irregular geometry air pores such as shown by Reference 2 in-between the substantially inter-connected strands of metal, with depth of the 3-dimensional porous metal absorber plate indicated by Reference 4, width indicated by Reference 5, and length indicated by Reference 6.
Figure 2:
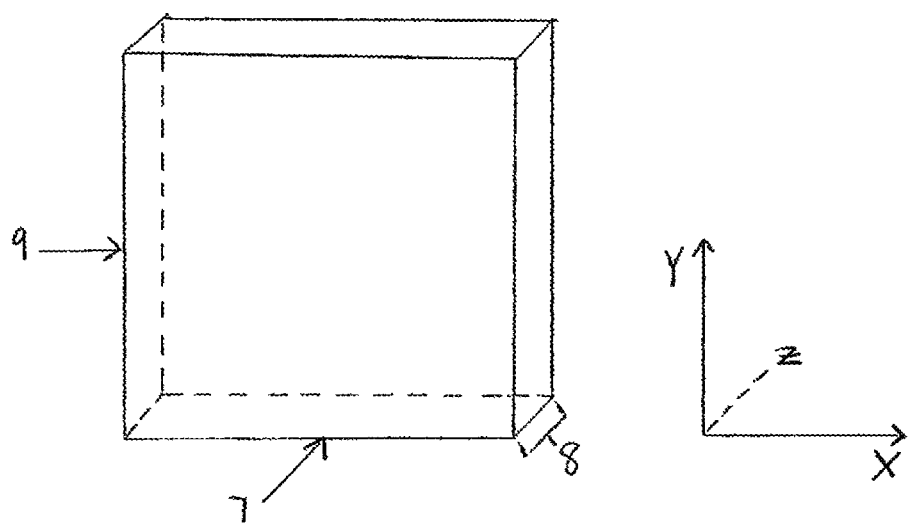
FIG. 2 is a front and side view of an example of a rectangle that represent the axis convention related to working fluid flow utilized herein, wherein Reference 7 refers to the width axis, defined herein as the "X axis" of the solar energy collection apparatus of the present invention, Reference 9 refers to the length axis and represents the net direction of working fluid flow into and out of the solar energy collection apparatus of the present invention, defined herein as the "Y axis" of the solar energy collection apparatus of the present invention, and Reference 8 refers to the depth axis, defined herein as the "Z axis" of the solar energy collection apparatus.
Figure 3:
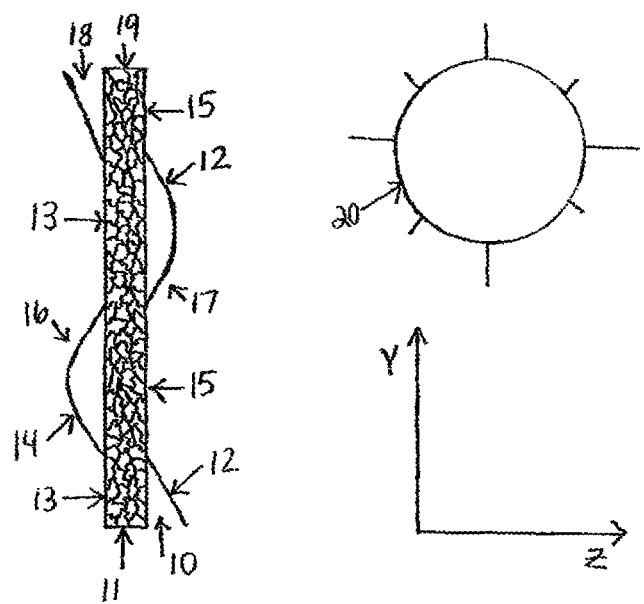
FIG. 3 shows a side view of a cross-sectional slice of an example of a solar energy collection apparatus of the present invention, with an example of the porous metal absorber plate enclosed in an example of the contoured cover glazings to induce alternating flow patterns along the length axis of the porous metal absorber plate, with depth of the porous metal absorber plate along the "Z axis" and length along the "Y axis", wherein Reference 10 refers to an entrance for working fluid into the space between a contoured top cover glazing and the porous metal absorber plate, Reference 11 refers to working fluid also having the ability of entering through the depth of the porous metal absorber plate, Reference 12 refers to a decreasing contour line of the top cover glazing to begin to guide the working fluid through the depth of the porous metal absorber plate, Reference 13 refers to a flat area of the bottom cover glazing that is close to or even touching the porous metal absorber plate to substantially restrict most of the flow from passing under the porous metal absorber plate, and Reference 14 refers to an increasing contour line along the bottom cover glazing to substantially allow the working fluid to enter along the bottom of the porous metal absorber plate, and Reference 15 refers to a flat area of the top cover glazing that is close to or even touching the porous metal absorber plate to substantially restrict most of the flow from passing on top of the porous metal absorber plate, and Reference 16 refers to a decreasing contour line along the bottom cover glazing to begin to guide the working fluid through the depth of the porous metal absorber plate, and Reference 17 refers to an increasing contour line along the top cover glazing to substantially allow the working fluid to enter along the top of the porous metal absorber plate, and Reference 18 refers to an increasing contour line along the bottom cover glazing to substantially allow working fluid to enter along the bottom of the porous metal absorber plate and to exit this example of a solar energy collection apparatus of the present invention, and Reference 19 refers to working fluid also having the ability to exit out the depth of the porous metal absorber plate, and Reference 20 refers to the location of the sun in relation to the convention used herein for the "top" and "bottom" cover glazings.
Figure 4:
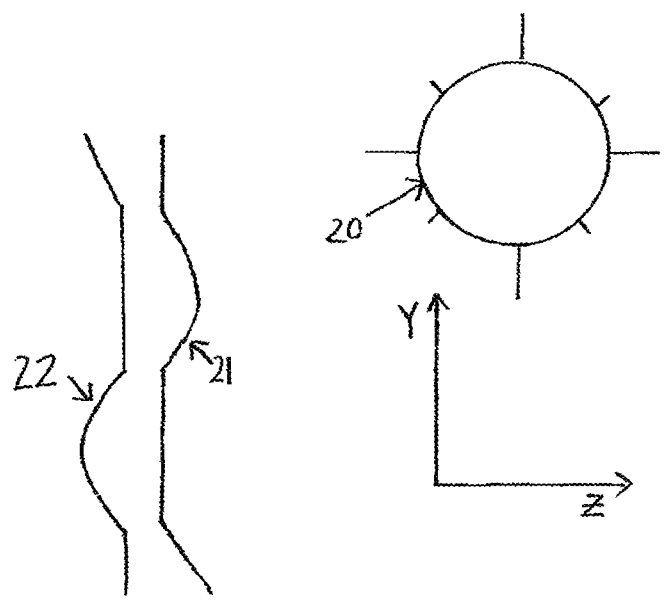
FIG. 4 shows a side view of a cross-sectional slice of an example of a contoured cover glazing of the present invention but without the porous metal absorber plate shown. Reference 21 refers to the top cover glazing, Reference 22 refers to the bottom cover glazing, and Reference 20 refers to the location of the sun in relation to the convention used herein for the "top" and "bottom" cover glazings.
Figure 5:
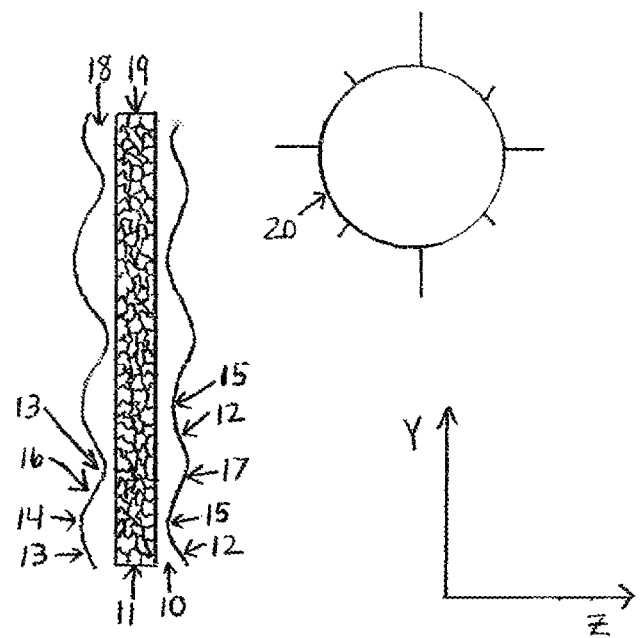
FIG. 5 shows a side view of a cross-sectional slice of an example of a solar energy collection apparatus of the present invention, with identical concepts and Reference numbers as FIG. 3 but with a different shape of contours to demonstrate just one of many other example of contour dimensions and shapes that can be utilized to achieve the alternating air flow of substantially on top of and through the depth of the porous metal absorber plate to on bottom of and through the depth of the porous metal absorber plate along the length axis of the porous metal absorber plate.
Figure 6:
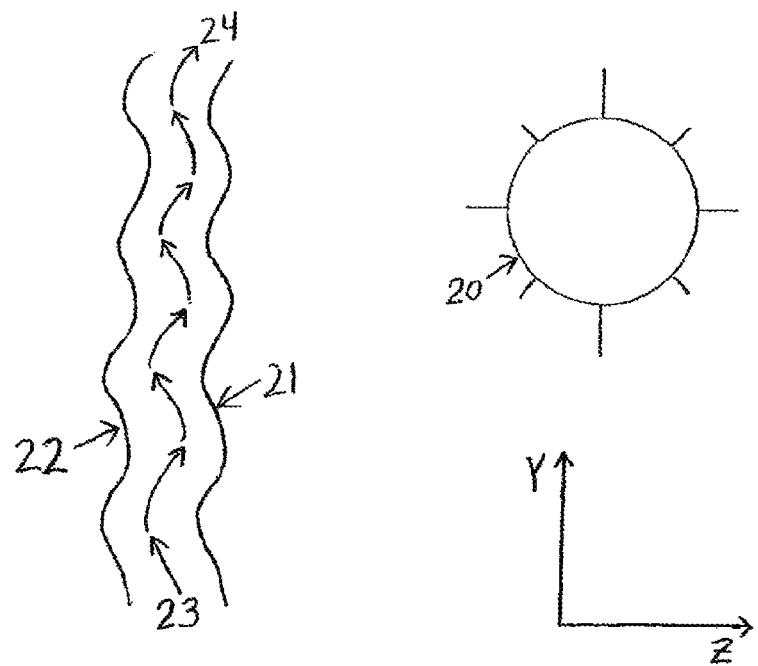
FIG. 6 shows a side view of a cross-sectional slice of an example of a contoured cover glazing with flow lines showing the basic idea of guiding of the working fluid through the porous metal absorber plate in a manner as described in FIG. 5, but without the porous metal absorber plate shown. Reference 21 refers to the top cover glazing, Reference 22 refers to the bottom cover glazing, Reference 23 refers to working fluid entering the solar energy collector of the present invention and being guided by the contoured cover glazings in the general direction of flow shown by the arrows throughout the length axis of the porous metal absorber plate, and working fluid exiting the solar energy collector shown by Reference 24, and Reference 20 refers to the location of the sun in relation to the convention used herein for the "top" and "bottom" cover glazings.
Figure 7:
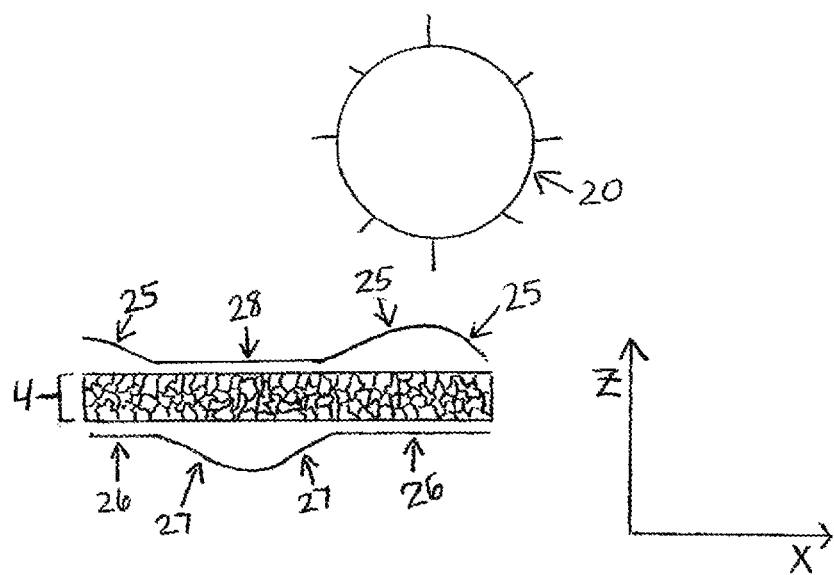
FIG. 7 shows a view of a slice along the length axis of an example of a solar energy collection apparatus of the present invention, with varying contour lines along the width axis (X axis). This is an example of achieving varying flow patterns above and below the porous metal absorber plate along the width axis. Reference 25 refers to a contour line in the top cover glazing that allows the working fluid to flow substantially on top of and through the depth of the porous metal absorber plate, Reference 26 refers to a flat contour line in the bottom cover glazing that is close to or even touches the porous metal absorber plate to substantially restrict the flow of working fluid on the bottom of the porous metal, Reference 27 refers to an increasing contour line along the bottom cover glazing to substantially allow the working fluid to enter along the bottom of the porous metal absorber plate, and Reference 28 refers to a flat area of the top cover glazing that is close to or even touching the porous metal absorber plate to substantially restrict most of the flow from passing on top of the porous metal absorber plate, and Reference 4 refers to the depth of the porous metal absorber plate, and Reference 20 refers to the location of the sun in relation to the convention used herein for the "top" and "bottom" cover glazings.
Figure 8:
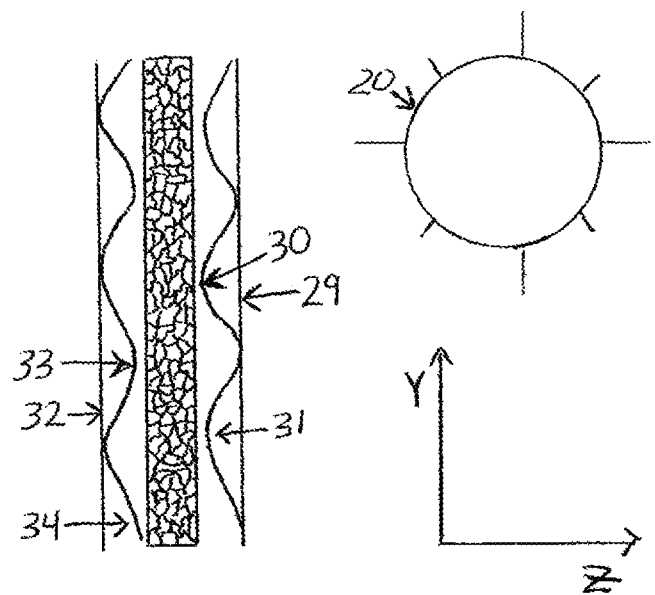
FIG. 8 shows an example of a double cover glazing top and bottom contoured cover glazing of the present invention, with Reference 29 referring to an outer top cover glazing that is flat, Reference 30 referring to an inner top cover glazing that is contoured to guide the working fluid according to the methods of the present invention, Reference 31 is the space between the outer and inner top cover glazings that can contain for example air, an inert gas, or be evacuated, Reference 32 referring to an outer bottom cover glazing that is flat, Reference 33 referring to an inner bottom cover glazing that is contoured to guide the working fluid according to the methods of the present invention, Reference 34 is the space between the outer and inner bottom cover glazings that can contain for example air, an inert gas, or be evacuated, and Reference 20 refers to the location of the sun in relation to the convention used herein for the "top" and "bottom" cover glazings.
Figure 9:
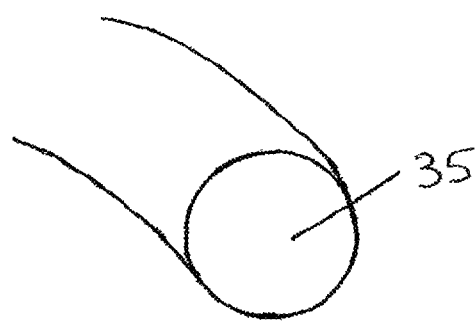
FIG. 9 shows a cross sectional area of an example of a single metal strand of an example of the porous metal absorber plate of the present invention, wherein Reference 35 refers to metal and/or combinations of metal that can both conduct electricity and provide electrical energy from the photovoltaic effect.
Figure 10:
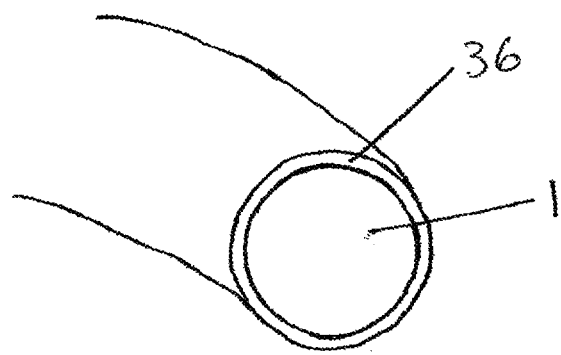

FIG. 10 shows a cross sectional area of an example of a single metal strand of an example of the porous metal absorber plate of the present invention, wherein Reference 1 refers to a metal strand of the porous metal absorber plate of the present invention, and wherein Reference 36 is a material that can provide a useful technical effect such as electrical energy from the photovoltaic effect, act as a solar energy absorbing coating, or catalytically destroy air pollutants.

Figure 11:
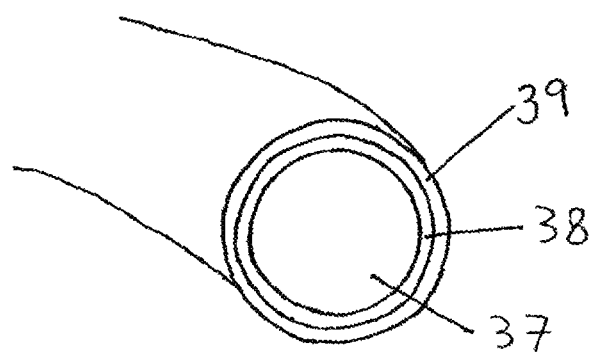

FIG. 11 shows a cross sectional area of an example of a single metal strand of an example of the porous metal absorber plate of the present invention, wherein Reference 37 refers to a metal that can at least conduct electricity, and wherein Reference 38 is a material that can provide electrical energy from the photovoltaic effect such as a p-type semiconductor, and wherein Reference 39 is another material that can provide electrical energy from the photovoltaic effect such as an n-type semiconductor.

Figure 12:
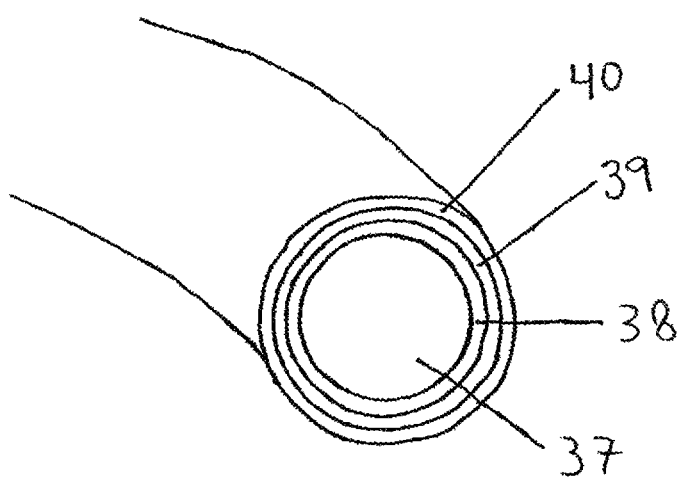

FIG. 12 shows a cross sectional area of an example of a single metal strand of an example of the porous metal absorber plate of the present invention, wherein Reference 37 refers to a metal that can at least conduct electricity, and wherein Reference 38 is a material that can provide electrical energy from the photovoltaic effect such as a p-type semiconductor, and wherein Reference 39 is another material that can provide electrical energy from the photovoltaic effect such as an n-type semiconductor, and wherein Reference 40 is an anti-reflective coating.

Further novel features and other advantages of the present invention will become apparent from the following description, discussion and the appended claims.

DESCRIPTION OF EMBODIMENTS

Although specific embodiments of the present invention will now be described, it should be understood that such embodiments are by way of example only and merely illustrative of but a small number of the many possible specific embodiments which can represent applications of the principles of the present invention. Changes and modifications by persons skilled in the art to which the present invention pertains are within the spirit, scope and contemplation of the present invention as further defined in the appended claims. All references cited herein are incorporated by reference as if each had been individually incorporated.

The porous metal absorber plate of the present invention has an open lattice-work of air pores and channels, to enable sunlight to penetrate deeper within the absorber plate and at a much faster rate compared to solar radiant energy conducting through a conventional solid metal plate. Additionally, because the porous metal plates of the present invention comprise of substantially inter-connected strands of metal, the porosity of the porous metal plates of the present invention can be higher while still retaining strength to be a singular object compared to individual strands of materials that are woven or pressed together. All sunlight rays that penetrate into the open lattice-work matrix of the present invention without obstruction reach the point of impact in the depth of the porous metal absorber plate at a much faster rate compared to solar light first being converted to heat upon impact of a conventional non-porous flat plate and then the heat traversing the depth of the absorber plate via heat conduction as occurs in a standard non-porous flat absorber plate. The open lattice-work of the porous metal absorber plate can capture more sun light rays per equivalent geometric perimeter area of a conventional non-porous flat absorber plate due to less reflective light escaping. Light rays that penetrate within the depth of the open lattice-work of the porous metal absorber plate of the present invention have the ability to absorb and reflect within the 3-dimensional porous latticework matrix, and can be captured within the 3-dimensional tortuous porous lattice of metal, as opposed to a conventional non-porous flat absorber plate wherein light rays are either absorbed or reflected at the thin surface layer only. The porous metal absorber plate of the present invention is therefore observed to possess high absorptive capacity for solar energy by possessing much greater light-penetrating depth than conventional non-porous sheet metal absorber plates, and a high rate of absorption of solar energy due to the open porous lattice enabling light ray penetration into the depths of the porous metal absorber plate at very high velocity, as well as faster heat transfer rates with the superior heat transfer method of convection within the porous metal lattice compared to conduction between a flat piece of sheet metal with e.g. pipes welded underneath, and reduced light escaping via improved absorption and reflection within the tortuous metal lattice for light rays that enter in the pores and achieve depth penetration within the porous metal lattice. The absorber plate of the present invention can thus offer high performance without expensive "selective coatings" that prior art has employed to improve absorption of sunlight and reduce light reflections. The absorber plate of the present invention can utilize standard coating methods such as appropriate black paint, or anodizing to make a black surface, or chemical vapor deposition techniques, and provide a high performance solar collector. Additionally, the porous metal absorber plate of the present invention can be coated with one or more colors, and the colors can make designs such as marbling, granite, roof shingle, siding, or shutter-like appearance, camouflaging to the background, or any number of pleasing designs or scenery. The colors can also be imprinted to make a pattern such as a company or sports team name or logo. A selective coating, such as electroplated black chrome, can be utilized on the porous metal absorber plate of the present invention. In some examples, only a portion of the porous metal absorber plate is coated only to a certain depth with a sunlight absorbing paint or sunlight absorbing electroplating coating or other means of coating to enable high absorption of sunlight. If a coating is placed on the porous metal, a controlled-depth coating can be achieved either by a manufacturing process that enables the coating to penetrate only to a certain depth. The porous metal plate enables convection throughout the lattice for high heat transfer rates and more uniform temperature distribution throughout the porous metal plate compared to typical non-porous flat plate collectors. The combination of the high contact area between the high surface area, high thermal and electrical conductivity porous metal absorber plate, the ability to achieve convective heat transfer process of a working fluid traversing through the porous metal lattice absorber plate with a tortuous path induced by the irregular pore geometry and irregular air channels, can all offer outstanding improvements compared to the conventional flat plate absorber solar collector. The high absorption of solar radiant energy combined with high heat transfer rate made possible by passing the working fluid through the porous metal absorber plate enclosed in cover glazing enables outstanding harvest of the solar energy absorbed by the porous metal absorber plate. The preferred contoured cover glazing enables greater extraction of the available solar radiant energy and greater utilization of the available solar thermal energy by the working fluid with lower flow resistance. A further advantage of passing the working fluid flow through the porous metal absorber plate, especially when enclosed in preferred contoured cover glazings, is that a greater volume of working fluid can be held in the collector per unit frontal area of collector compared to conventional limited number of pipes and working fluid volume per unit frontal area of collector in a conventional flat plate or evacuated tube collector. By enabling a greater volume of working fluid per unit frontal area of collector, the contact time in the collector (working fluid volume in the solar collector divided by working fluid flow rate) can be increased, to allow the working fluid to achieve a higher temperature and/or to enable more working fluid to be heated per unit frontal area of solar energy collector, and thereby enable more useful thermodynamic work to be extracted from the working fluid. By extracting the solar thermal energy absorbed throughout the 3-dimensional porous metal absorber plate with a working fluid traversing therein, any material that exhibits the photovoltaic electric effect that is incorporated into or coated onto the 3-dimensional porous metal absorber plate will typically operate more efficiently due to the temperature effect on the photovoltaic electric effect.

The porosity of the porous metal absorber plate can range from approximately 85% to about 98%, or from approximately 90% to about 98%. This high degree of porosity of the metal absorber plate for the present invention can enable working fluid to be passed directly through the absorber plate. The porosity of the metal absorber plate of the present invention can be selected such that working fluid can pass directly through long path lengths of the porous 3-dimensional absorber plate, such as 50 millimeters (mm) or more, 100 mm lengths or more, or even 200 mm lengths or more, or even 500 mm lengths or more, or even 900 mm lengths or more. The pore size of the porous metal absorber plate can range from about 0.1 mm to about 10 mm, or from about 0.1 to about 5 mm, or from about 0.1 to about 3 mm. The volume density of the porous metal absorber plate can be from about 0.1 to about 3 grams per cubic centimeter (cc), or from about 0.1 to about 2 grams/cc, or from about 0.1 to about 1 grams/cc, or from about 0.3 to about 0.6 grams/cc. The porous metal absorber plate of the present invention is a 3-dimensional structure, with a depth of the porous metal absorber plate that can range from about 1 mm to about 100 mm, or from about 1 mm to about 50 mm, or from about 1 mm to about 25 mm, or from about 1 to about 10 mm, or from about 2 to about 10 mm, or from about 3 to about 6 mm. The pore structure is irregular geometry so that the path through the porous metal absorber plate is tortuous; this is in contrast to other types of structures that have a regular geometry with well-defined air channels such as a honeycomb structure with for example hexagonal or triangular pores. The irregular geometry pore structure of the present invention can consist of rounded or other shaped pores that are inter-connected at various depths along the depth axis of the porous metal absorber plate such that the pore structure along the depth, width, and length access is irregular, creating a tortuous path throughout the depth, width, and length of the porous metal absorber plate. The air pores and channels of the present invention enable the working fluid to traverse throughout any of the length, width, and depth axis of the porous metal absorber plate. The metal of the porous metal absorber can be one or more metals or metal compounds selected from the group consisting of copper, aluminum, silicon, silicon dioxide, manganese dioxide, titanium dioxide, cadmium telluride, copper indium selenide/sulfide, metals of the periodic table of elements, metal oxides, metalloids of the periodic table of elements, organometallic compounds that exhibit the photovoltaic electric effect, dye sensitized solar cell photovoltaic materials, and any other material that exhibits the photovoltaic electric effect. Open-celled foamed metal structures are preferred for the present invention, wherein open-cell foamed metal structures comprise of air pores that form air channels that are substantially inter-connected throughout the length, width, and depth axis of the porous metal absorber plate of the present invention, and the exceptionally high porosity of these foamed metal structures while possessing sufficient inter-connected strands of metal to remain sufficiently strong as a singular object. Foamed copper and foamed aluminum are particularly preferred for their exceptional thermal and electrical properties such as thermal and electrical conductivity and high porosity that can be 85% or more, or even 90% or more, or even 95% or more, or even 97% or more porosity, while still retaining sufficient inter-connectivity to remain a sufficiently strong singular object. The porous metal absorber plates of the present invention can also serve as a substrate. The porous metals can be used as a substrate that incorporates one or more other metals, metal compounds, and/or organic compounds or organometallic compounds that exhibit the photovoltaic electric effect and/or can achieve catalytic destruction of one or more undesirable constituents in the working fluid and/or achieve other desirable technical effects, wherein the other metals, metal compounds, and/or organic compounds or organometallic compounds that exhibit the photovoltaic electric effect and/or achieve catalytic destruction of one or more undesirable constituents in the working fluid and/or other desirable technical effect are either incorporated within or coated onto the 3-dimensional porous absorber plates matrix of metal strands. Foamed copper and foamed aluminum are particularly preferred for use as a substrate in this manner, for the present invention. A multi-junction thin film solar photovoltaic combination, such as gallium arsenide, germanium, gallium indium phosphide, can be incorporated into, and/or coated onto, the 3-dimensional porous metal absorber plates of the present invention. For example, more solar photovoltaic production per unit front absorber plate area can be gained by using more depth of the porous metal absorber plate and any material exhibiting the solar photovoltaic effect incorporated into and/or coated onto the porous metal absorber plate, instead of the typical thin surface of 2-dimensional absorbing panels in photovoltaic applications. The increased photovoltaic production per unit front absorber area can substantially reduce the space requirements of a solar photovoltaic system. The entire porous metal absorber plate can be comprised of solar photovoltaic generating materials. Light rays that penetrate within the depth of the open lattice-work of the porous metal absorber plate of the present invention have the ability to absorb and reflect within the 3-dimensional porous lattice-work matrix, and can be captured within the 3-dimensional tortuous and porous lattice, as opposed to a conventional non-porous flat absorber plate wherein light rays are either absorbed or reflected at the thin 2-dimensional surface layer only. The high surface area porous metal matrix also offers high surface area for high loading capacity of photovoltaic electric generating materials incorporated into or coated onto the porous metal matrix. The porous metal may be painted black or other colors or combinations of colors, or coated with a sunlight absorbing material with chemical deposition techniques, or any other known coating method. Additionally, combinations of materials selected from the group consisting of copper, aluminum, silicon, silicon dioxide, manganese dioxide, titanium dioxide, cadmium telluride, copper indium selenide/sulfide, metals of the periodic table of elements, metal oxides, metalloids of the periodic table of elements, organometallic compounds that exhibit the photovoltaic electric effect, dye sensitized solar cell photovoltaic materials, and any other material that exhibits the photovoltaic electric effect and/or achieve catalytic destruction of one or more undesirable constituents in the working fluid and/or other desirable technical effects, can be utilized as the porous metal absorber plate for the present invention.

In some examples, at least one material that can provide electrical energy from the photovoltaic effect can be coated onto the strands of metal that form the 3-dimensional porous metal absorber plate and at least one different material that can provide electrical energy from the photovoltaic effect can be incorporated into the 3-dimensional porous metal absorber plate. In some examples, at least one material that can provide electrical energy from the photovoltaic effect is coated as an inner coating onto the strands of metal that form the 3-dimensional porous metal absorber plate, and at least one different material that can provide electrical energy from the photovoltaic effect is further coated as an outer coating on top of the inner coating of the 3-dimensional porous metal absorber plate. For example, an n-type semiconductor doped silicon can be applied as an outer coating on top of a p-type semiconductor doped silicon inner coating. In other examples, 3 or more coating layers of materials that exhibit the photovoltaic electric effect and/or are electrical conductive materials can be utilized as coatings on top of the porous metal absorber plate. An anti-reflection coating such as silicon nitride or titanium dioxide can also be utilized as the outer-most coating.

In other applications, a working fluid that contains one or more materials that exhibit the photovoltaic effect can be passed through or contained within the 3-dimensional porous metal absorber plate, and the electrical energy generated from the photovoltaic effect can conduct throughout the 3-dimensional porous metal absorber plate. In these examples, the working fluid can be for example in a liquid, gel, or gas state. In these and other examples, the working fluid can be dyed to a semi-transparent black or other color to enhance the solar light absorption efficiency.

A rear metal contact plate can be placed at the rear side of the porous metal absorber plate. A metal sheet or grid that acts as a highly electrically conductive cover glazing can be utilized, to serve as a back electrical contact for the electricity provided from any photovoltaic material of the porous metal absorber plate of the present invention to flow to. A rear metal contact plate can have a solar light reflective surface to enable sun light that transmits through the porous metal absorber plate to be reflected back into the porous metal absorber plate. A polymeric layer or glazing can be placed on the back of the metal contact to serve as an insulator for either or both the solar photovoltaic energy harnessed and the solar thermal energy harnessed in the solar energy collection apparatus of the present invention. Electricity provided by the photovoltaic electric effect can flow through the metal strands of the porous metal absorber plate either to a rear metal contact plate, or to flat wire or wire ribbon connected to the metal strands. The electricity can then flow in wires or other electrically conductive methods to an area where useful electrical work can be accomplished. Two or more solar energy collection apparatus of the present invention can be wired in series or parallel.

The entire porous metal absorber plate can be comprised of solar photovoltaic generating materials. In some applications, the metal of the porous metal absorber plate can remain as bare metal. Working fluid can be passed directly through the length, depth, or width axis of the porous metal absorber plate. More than one porous metal absorber plates can be utilized in the same solar energy collection apparatus of the present invention, either placed side by side to increase either or both of the total length and width of porous metal absorber plate or placed on top of one another to increase the total depth of porous metal absorber plate.

In the improved solar energy collector apparatus of the present invention, one or more porous metal absorber plates can be enclosed within cover glazing, and preferably contoured cover glazings that can guide a working fluid to traverse on top of, through the depth of, and on the bottom of the porous metal absorber plate in an alternating fashion. The cover glazings of the porous metal solar energy absorber plates of the present invention can be made of a transparent or semi-transparent material. Utilizing transparent bottom side cover glazing can enable additional transparent area for solar energy to be reflected onto and harvested by the porous metal absorber plate and any working fluid traversing therein. Alternatively, a solar light reflective coating or solar light reflecting film can be placed on the bottom side cover glazing, to enable sun light that transmits through the porous metal absorber plate to be reflected back into the porous metal absorber plate. The top and bottom cover glazings can be made as a singular structure with sidewalls and a gap in the middle to insert the porous metal absorber plate(s). Alternatively the top and bottom cover glazings can be made as 2 distinct covers and joined together with sidewalls. Double-glazings can be used for either or both the top and bottom cover glazings, such as having an outer glazing and an inner glazing. As used herein, the term inner glazing refers to the cover glazing that is closer to the porous metal absorber plate relative to the outer cover glazing. If double-glazings are utilized, the space in between glazings can be filled with air, an inert gas, or evacuated to increase the insulating effectiveness of the cover glazings.

In examples where contoured shaped cover glazings are utilized, the contoured shaped cover glazings can allow the working fluid to traverse on top of the absorber plate, then guide the working fluid flow through the depth of the absorber plate, then allow the flow along the bottom of the absorber plate in alternating fashion at various lengths along the length axis (Y axis) of the porous metal absorber plate. For example, the top cover glazing can be contoured to allow flow to traverse on top of the porous metal absorber plate while the bottom cover glazing is close to or even touches the porous metal absorber plate to substantially restrict flow from going through the bottom of the porous metal absorber plate, and then the contour of the top cover glazing is gradually reduced until the top cover glazing comes close to or even touches the porous metal absorber plate such that flow is guided substantially through the depth of the porous metal absorber plate and allowed to flow along the bottom of the porous metal absorber plate by increasing the contour of the bottom cover glazing. The flow continues in this fashion for some length along the length axis (Y axis) of the porous metal absorber plate, until the contour of the bottom cover glazing is gradually reduced until the bottom cover glazing comes close to or even touches the porous metal absorber plate such that flow is guided substantially through the depth of the porous metal absorber plate and allowed to flow along the top of the porous metal absorber plate by increasing the contour of the top cover glazing. This alternating flow pattern can be repeated one or more times along the length axis of the porous metal absorber plate. The alternating flow pattern enables high efficiency transfer of the energy absorbed in the porous metal absorber plate to the working fluid, with low resistance to flow. The alternating flow pattern can also improve the contact with for example any undesirable constituents in any working fluid and any catalyst incorporated into or coated onto the porous metal absorber plate, for improved reaction efficiency. The alternating flow pattern can also be performed along the width axis (X axis) of the porous metal absorber plate in addition to being performed along the length axis (Y axis) of the porous metal absorber plate. Smoothed contours such as rounded wave shapes are preferred because smooth contours can achieve the desired alternating flow pattern at less flow resistance compared to abrupt contour changes. Contoured top and bottom cover glazings made from polymers can be utilized in the present invention due to their lighter weight and less fragility compared to glass, and the ability of plastics to easily be molded into contoured structures. Double-glazings can be used for either or both the top and bottom cover glazings, such as having an outer, flat glazing and an inner contoured glazing to guide the working fluid in the alternating flow pattern. As used herein, the term inner contoured glazing refers to the cover glazing that is closer to the porous metal absorber plate relative to the outer flat cover glazing. If double-glazings are utilized, the space in between glazings can be filled with air, an inert gas, or evacuated to increase the insulating effectiveness of the cover glazings.

In some examples, the porous metal absorber plate is enclosed in contoured cover glazings that guide a gaseous state working fluid in an alternating fashion of working fluid flow substantially on the top of and through the depth of the porous metal absorber plate to substantially on the bottom of and through the depth of the porous metal absorber plate at least along the length axis of the porous metal absorber plate, and wherein the static pressure is not more than 0.5 inches of water per 600 millimeters of length axis of porous metal absorber plate at a linear velocity of the gaseous state working fluid of not less than 2.0 meters per second. As used herein, the term "linear velocity of the gaseous state working fluid" is calculated based on the total volumetric flow rate of gaseous state working fluid traversing through the solar energy collection apparatus of the present invention divided by the cross sectional area of the porous metal absorber plate of the present invention, wherein the cross-sectional area of the porous metal absorber plate is calculated as the depth of the porous metal absorber plate (Z axis) multiplied by the width of the porous metal absorber plate (X axis). In other examples, the porous metal absorber plate is enclosed in contoured cover glazings that guide a gaseous state working fluid in an alternating fashion of working fluid flow substantially on the top of and through the depth of the porous metal absorber plate to substantially on the bottom of and through the depth of the porous metal absorber plate at least along the length axis of the porous metal absorber plate, and wherein the static pressure is not more than 0.5 inches of water per 600 millimeters of length axis of porous metal absorber plate at a linear velocity of the gaseous state working fluid of 3.0 meters per second or more, or even 4.0 meters per second or more, or even 5.0 meters per second or more.

Working fluid can enter into the solar energy collector apparatus of the present invention, either by means of forced convection by pulling vacuum at the outlet of the solar energy collector apparatus with a mechanical device such as an air blower or air compressor or pump, or by forced convection by pressurizing a working fluid with a mechanical device such as an air blower or air compressor or pump at an inlet of the solar energy collector apparatus, or by gravity, or natural convection, or by thermosiphoning, or any other means of fluid motion. Working fluid that traverses throughout the 3-dimensional porous metal absorber plate enclosed in cover glazings can efficiently extract solar thermal energy absorbed by the 3-dimensional porous metal absorber plate. Working fluid that traverses throughout the 3-dimensional porous metal absorber plate enclosed in the preferred contoured cover glazings can efficiently extract solar thermal energy absorbed by the 3-dimensional porous metal absorber plate with less resistance to the flow of the working fluid. The working fluid can then traverse to another location via duct or conduit or other means, wherein the solar thermal energy absorbed in the working fluid can be utilized for useful work. Other appropriate materials selected from the list of metals, metal compounds, metalloids, organic compounds, or organometallic compounds that are incorporated into and/or coated onto the 3-dimensional porous metal absorber plate can provide electricity from the solar photovoltaic effect and/or catalytic destruction of undesirable constituents that may be in the working fluid. The electricity provided from the solar photovoltaic effect can conveniently be carried along the metal strands of the porous metal absorber plate acting as electrical wire. The electricity can flow along the 3 dimensional strands of metal in the porous metal absorber plate to a metal plate backing and then into wire where it can traverse to a location where desirable electrical work can be achieved, and/or the electricity can flow along the 3 dimensional strands of metal in the porous metal absorber plate directly to other wire where it can traverse to a location where desirable electrical work can be achieved. Portions of the porous metal absorber plate can advantageously be uncoated for making metal to metal contacts with wires entering or exiting the solar energy collection apparatus and/or any rear metal plate contacting the porous metal absorber plate. The electricity provided by the suitable materials incorporated into or coated onto the porous metal absorber plate can be inverted to alternating current (AC) power on the solar energy collection apparatus of the present invention, or traverse as direct current (DC) power to another location where it can either be used as DC power directly or inverted to AC power. The electricity can return to the solar energy collection apparatus of the present invention via wire, to form a completed circuit. Utilizing both solar thermal energy harvest and solar photovoltaic energy harvest in the 3-dimensional porous metal absorber plates is an outstanding way to maximize the solar energy for a wide variety of uses. Additionally, by harvesting the solar thermal energy via a working fluid that traverses directly through the 3-dimensional porous metal absorber plate, the working fluid can keep the solar energy collection apparatus cooler. The photovoltaic electrical energy generation efficiency is well known to be higher at cooler temperatures. A particularly preferred working fluid is air or other fluids in the gaseous state, and a particularly preferred method is to used forced convection of air through the solar energy collection apparatus of the present invention to transfer the solar thermal energy to the air to achieve useful thermal energy work while cooling the porous metal absorber plate such that solar photovoltaic materials incorporated into or coated onto the porous metal absorber plate can achieve high efficiency solar electricity generation. Alternatively for some applications, only solar thermal energy is achieved in the solar energy collection apparatus of the present invention. Alternatively for other applications, only solar electrical energy is utilized from the solar energy collection apparatus of the present invention. Alternatively for other applications, solar thermal energy and catalytic destruction of one or more undesirable constituents in the working fluid is achieved in the solar energy collection apparatus of the present invention. In still other applications, solar thermal energy, solar photovoltaic energy, and catalytic destruction of one or more undesirable constituents in the working fluid are achieved in the solar energy collection apparatus of the present invention. In still other applications, other desirable technical effects are achieved with one or more materials coated onto or incorporated into the porous metal absorber plate of the present invention while either or both solar thermal or solar electric energy is harvested.

The solar energy collection apparatus of the present invention can also be utilized as a wall or a roof for a structure; thus in addition to providing solar energy, the solar energy collection apparatus of the present invention provides protection and/or privacy from the outdoors by acting as a wall or a roof for a structure.

Stabilizing any plastic used for any cover glazings and sidewalls for ultra-violet light resistance is preferred. Anti-reflective or anti-abrasion coatings may also be used for the cover glazings and sidewalls.

Utilizing air or other gases as a working fluid in the solar energy collector apparatus of the present invention has many advantages. For example, air is always available at any location, and using air avoids the weight associated with using liquids such as glycol or water as the working fluid. Air also has the advantage of a low heat capacity, and thus heats up much faster than water or glycol for the equivalent solar energy input. Air can also be heated and utilized easily at or near ambient pressure with the solar energy collector apparatus of the present invention, and thus avoids the associated costs with making a solar energy collection apparatus that requires the added expense of building a solar energy collection apparatus that can withstand both the weight and pumping pressures of liquid working fluids. Air that can be at higher than ambient temperature can be drawn from an area where heat is not desired such as an attic or boiler room, or flue gas exhaust from a gas water heater or boiler. By utilizing higher than ambient air temperature from a location where it is undesirable such as an attic, additional thermal energy can be harvested to improve the energy output and economics of the total system. Wasted heat energy that passes out the exhaust (flue gas) of a gas water heater or boiler can be re-captured when passed through the solar energy collectors of the present invention. For applications where flue gas is used as some or all of the working fluid to the solar energy collectors of the present invention, the porous metal absorber plate can have appropriate materials coated onto or incorporated into the metal strands that can destroy or reduce the concentration of toxins such as nitrogen oxides in the flue gas. The exhaust of a gas water heater or boiler can advantageously contain a higher percentage of carbon dioxide compared to ambient air. Carbon dioxide absorbs infrared light; as a significant fraction of solar energy is in the infrared light region, the carbon dioxide content in flue gas can boost the solar energy absorption in the solar energy collectors of the present invention. The exhaust of a gas water heater or boiler can advantageously contain a higher percentage of water vapor compared to ambient air. Water vapor can contain high thermal energy content, especially if it undergoes a phase change upon condensation. The water vapor in the flue gas can be heated in the solar collectors of the present invention, and condense upon heat exchange to a heat sink, to boost the total energy output from the solar energy collectors of the present invention. In the present invention, air or other gas can advantageously be heated by the solar energy collection apparatus of the present invention, and then the heated air or other gas is moved to a location where desirable work can be achieved. This can easily be accomplished by an air blower or air compressor, either by drawing vacuum by locating the air blower or air compressor on the heated air outlet side of the solar energy collector apparatus of the present invention, or by forcing ambient air with an air blower or air compressor into an inlet working fluid intake of the solar energy collector apparatus of the present invention. Appropriate duct work/conduit is then utilized to contain and move the solar energy warmed air to the location at which the desired exchange of the solar energy warmed air can transfer its thermal energy. The air blower or air compressor can be powered by normal AC electric current, or advantageously employ a 12 volt DC motor that can easily be driven by a solar electric (photovoltaic) energy collector, with or without battery backup power. The solar energy collection apparatus of the present invention can be utilized to produce solar electric energy to power the air blower or air compressor or for other electrical energy uses in addition to providing solar thermal energy. Insulated duct work can maintain most of the thermal energy available in the heated air as it is carried to a location where useful thermal energy is desired. Any of a photocell, timer, thermostat, and differential thermostat can be utilized so that the blower or compressor only operates during daylight hours or when a desired temperature or temperature differential exists to turn the air blower or air compressor on to initiate air flow to a location where desirable work can be achieved. Other working fluids can be utilized as well.

For any of the solar energy collection apparatus of the present invention, a similar apparatus can be used as the heat exchanger at the location wherein the solar energy is to be utilized for useful work. For example, a manifold that splits a cold water line into several pipes can traverse through 2 porous metal absorber plates with molded spaces for the pipes to fit in between the 2 porous metal absorber plates. The 2 porous metal absorber plates are enclosed within cover glazings, and preferably the contoured cover glazings described in the present invention to provide the alternating flow patterns on top, through the depth, and on the bottom of porous metal absorber plates. The advantages relating to energy transfer of the porous metal absorber plates enclosed in cover glazings, and preferably the contoured cover glazings of the present invention, also work outstanding in reverse, at the location where the thermal energy harvested by the solar energy collectors is to be exchanged. The flow direction of cold water in the pipes can be counter-current to the flow of working fluid produced by the solar energy collectors of the present invention, for highest efficiency heat exchange.

In other embodiments, any combination of the above embodiments can be utilized together.

I claim:

1. A solar energy collection apparatus comprising of:
said solar energy collection apparatus comprises an absorber plate, said absorber plate comprises porous metal, in which said porous metal comprises substantially inter-connected strands of metal, and wherein said absorber plate comprises at least one metal that can conduct electricity and comprises at least one material that can provide electrical energy from the photovoltaic effect, and wherein said electrical energy can conduct throughout the substantially inter-connected strands of metal, said porous metal further comprises a substantially open lattice work of air pores between said substantially inter-connected strands of metal, wherein said inter-connected strands of metal being configured to form a substantially singular object with said open lattice work of air pores, in which said porous metal further comprises a porosity of approximately 85% to 98%, and said open lattice work of air pores comprises a pore size of approximately 0.1 mm to 10 mm, said porous metal further comprises a volume density of approximately 0.1 to 1 grams per cubic centimeter (cc), wherein said porosity, pore size, and density of said porous metal being configured to enable a working fluid to substantially traverse throughout said open lattice work of air pores between said inter-connected strands of metal of said absorber plate, and said porous metal absorber plate further comprises a depth of approximately 1 mm to 100 mm, and wherein said depth of said porous metal being configured to trap light rays that penetrates said porous metal absorber plate and generally refracting and reflecting said light rays within said open lattice work of air pores between said inter-connected strands of metal, and said porous metal absorber plate being configured to enable a working fluid to substantially traverse throughout said open lattice work of air pores between said inter-connected strands of metal of said absorber plate as to enable substantial solar energy harvest from said solar energy collection apparatus without the use of a radiation trap structure in-between said porous metal absorber plate and any type of cover glazing of said solar energy collection apparatus.

2. The solar energy collection apparatus of claim 1, in which said cover glazing are contoured cover glazing being configured to guide said working fluid in an alternating fashion of working fluid flow substantially on the top of and through the depth of said absorber plate to substantially on the bottom of and through the depth of the said absorber plate along at least one axis of said absorber plate selected from the list of the length axis and the width axis.

3. The solar energy collection apparatus of claim 1, wherein the back side of said cover glazing contains any form of solar light reflection such that any light that transmits through said absorber plate can be substantially reflected back into said absorber plate.

4. The solar energy collection apparatus of claim 1, wherein said cover glazing is a double-glazing comprising of a contoured inner glazing and a flat outer glazing.

5. The solar energy collection apparatus of claim 1, in which said working fluid contains at least one material that exhibits the photovoltaic effect.

6. The solar energy collection apparatus of claim 1 configured for generating energy selected from the list of photovoltaic electrical energy, solar thermal energy, and any combination thereof.

7. The solar energy collection apparatus of claim 1, in which said working fluid is forced through said solar energy collection apparatus with forced convection from a mechanical device selected from the list of an air blower, an air compressor, and pump, and wherein said mechanical device is powered by solar photovoltaic energy generated in said solar energy collection apparatus.

8. A solar energy collection apparatus comprising of:
said solar energy collection apparatus comprises an absorber plate, said absorber plate comprises porous metal, in which said porous metal comprises substantially inter-connected strands of metal, and said porous metal further comprises a substantially open lattice work of air pores between said substantially inter-connected strands of metal, wherein said inter-connected strands of metal being configured to form a substantially singular object with said open lattice work of air pores, in which said porous metal further comprises a porosity of approximately 85% to 98%, and said open lattice work of air pores comprises a pore size of approximately 0.1 mm to 10 mm, said porous metal further comprises a volume density of approximately 0.1 to 1 grams per cubic centimeter (cc), wherein said porosity, pore size, and density of said porous metal being configured to enable a working fluid to substantially traverse throughout said open lattice work of air pores between said inter-connected strands of metal of said absorber plate, and wherein said working fluid contains at least one material that exhibits the photovoltaic effect, and wherein the electrical energy generated by the photovoltaic effect can conduct throughout the substantially inter-connected strands of metal of said absorber plate, and said porous metal absorber plate further comprises a depth of approximately 1 mm to 100 mm, and wherein said depth of said porous metal being configured to trap light rays that penetrates said porous metal absorber plate and generally refracting and reflecting said light rays within said open lattice work of air pores between said inter-connected strands of metal, and said porous metal absorber plate being configured to enable a working fluid to substantially traverse throughout said open lattice work of air pores between said inter-connected strands of metal of said absorber plate as to enable substantial solar energy harvest from said solar energy collection apparatus without the use of a radiation trap structure in-between said porous metal absorber plate and any type of cover glazing of said solar energy collection apparatus.

9. The solar energy collection apparatus of claim 8, in which the back side of said cover glazing contains any form of solar light reflection such that any light which transmits through said absorber plate can be substantially reflected back into said absorber plate.

10. The solar energy collection apparatus of claim 8 configured for generating energy selected from the list of photovoltaic electrical energy, solar thermal energy, and any combination thereof.

11. The solar energy collection apparatus of claim 8, in which said working fluid is forced through said solar energy collection apparatus with forced convection from a mechanical device selected from the list of an air blower, an air compressor, and pump, and wherein said mechanical device is powered by solar photovoltaic energy generated in said solar energy collection apparatus.

12. A solar energy collection apparatus comprising of:
said solar energy collection apparatus comprises an absorber plate, said absorber plate comprises porous metal, in which said porous metal comprises substantially inter-connected strands of metal, said porous metal further comprises a substantially open lattice work of air pores between said substantially inter-connected strands of metal, wherein said inter-connected strands of metal being configured to form a substantially singular object with said open lattice work of air pores, in which said porous metal further comprises a porosity of approximately 85% to 98%, and said open lattice work of air pores comprises a pore size of approximately 0.1 mm to 10 mm, said porous metal further comprises a volume density of approximately 0.1 to 1 grams per cubic centimeter (cc), wherein said porosity, pore size, and density of said porous metal being configured to enable a working fluid to substantially traverse throughout said open lattice work of air pores between said inter-connected strands of metal of said absorber plate, and said porous metal absorber plate further comprises a depth of approximately 1 mm to 100 mm, and wherein said depth of said porous metal being configured to trap light rays that penetrates said porous metal absorber plate and generally refracting and reflecting said light rays within said open lattice work of air pores between said inter-connected strands of metal of said absorber plate substantially preventing said light rays from escaping, and said porous metal absorber plate being configured to enable a working fluid to substantially traverse throughout said open lattice work of air pores between said inter-connected strands of metal of said absorber plate as to enable substantial solar energy harvest from said solar energy collection apparatus without the use of a radiation trap structure in-between said porous metal absorber plate and any type of cover glazing of said solar energy collection apparatus, and wherein said cover glazing comprises contoured cover glazing, in which said contoured cover glazing enclose said absorber plate, and wherein said contoured cover glazing comprise of at least one entrance and one exit for a working fluid to enter and exit said solar energy collection apparatus, and wherein said contoured cover glazing being configured to guide a working fluid in an alternating fashion of working fluid flow substantially on the top of and through the depth of said absorber plate to substantially on the bottom of and through the depth of the porous metal absorber plate along at least one axis of said absorber plate selected from the list of the length axis and the width axis.

13. The solar energy collection apparatus of claim 12, wherein said absorber plate comprises of at least one other material that achieves a desired technical effect on said working fluid traversing through said solar energy collection apparatus, and wherein said other material is comprised within said absorber plate with the method selected from the list of incorporated into said substantially interconnected strands of metal, coated onto said substantially interconnected strands of metal, and any combinations thereof.

14. The solar energy collection apparatus of claim 12, wherein the back side of said cover glazing contains any form of solar light reflection such that any light that transmits through said absorber plate can be substantially reflected back into said absorber plate.

15. The solar energy collection apparatus of claim 12, wherein said cover glazing is a double-glazing comprising of a contoured inner glazing and a flat outer glazing.

16. The solar energy collection apparatus of claim 12, in which said working fluid contains at least one material that exhibits the photovoltaic effect.

17. The solar energy collection apparatus of claim 12 configured for generating energy selected from the list of photovoltaic electrical energy, solar thermal energy, and any combination thereof.

18. The solar energy collection apparatus of claim 12, in which said working fluid is forced through said solar energy collection apparatus with forced convection from a mechanical device selected from the list of an air blower, an air compressor, and pump, and wherein said mechanical device is powered by solar photovoltaic energy generated in said solar energy collection apparatus.

* * * * *